Patented May 7, 1946

2,400,029

UNITED STATES PATENT OFFICE 2,400,029

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application April 20, 1944,
Serial No. 532,003

12 Claims. (Cl. 260—79)

My invention relates to improvements in the compounding and vulcanization of synthetic rubbers of the type produced by copolymerization of butadiene and acrylonitrile. This type of synthetic rubber is illustrated by the product currently designated GR-N rubber and Perbunan. My invention includes a modified vulcanized copolymer and the product of vulcanization of the modified copolymer.

The following examples are illustrations of my invention and include comparisons indicating some of its advantages. The compound of each of the three examples was made up of 100 parts of Perbunan, 1 part of stearic acid, 5 parts of zinc oxide, 5 parts of coal tar, 48 parts of channel carbon black, 1.5 parts of sulfur and 1.5 parts of benzothiazyldisulphide, all parts being by weight. The compound of Example II also included 0.1 part of metallic copper powdered to pass a 300 mesh screen and the compound of Example III also included 0.1 part of the same powdered copper and 0.15 part of zinc diethyldithiocarbamate. These compounds were cured in a platen press for the several periods indicated in minutes at the left of the following tabulation, all of the cures being effected at 307° F. The values for stress at 300% elongation in pounds per square inch appear under "S," for tensile strength in pounds per square inch under "T," for percentage elongation at break under "E" and for Shore hardness under "H" for each of the compounds and for each of the cures in the following tabulation:

|  | Example I | | | | Example II | | | | Example III | | | |
|---|---|---|---|---|---|---|---|---|---|---|---|---|
|  | S | T | E | H | S | T | E | H | S | T | E | H |
| 5 minutes | 505 | 1110 | 740 | 57 | 920 | 2210 | 605 | 63 | 1430 | 2210 | 430 | 65 |
| 10 minutes | 1100 | 2480 | 595 | 63 | 1300 | 2420 | 480 | 65 | 1750 | 2320 | 365 | 68 |
| 15 minutes | 1390 | 2590 | 490 | 65 | 1530 | 2570 | 445 | 67 | 1910 | 2260 | 365 | 70 |
| 20 minutes | 1500 | 2620 | 450 | 67 | 1680 | 2490 | 400 | 69 | 2030 | 2240 | 345 | 70 |

The copper appears to be effective in proportions ranging from about 0.005 to about 1% by weight on the copolymer although a proportion of about 0.1% is particularly advantageous. The copper may be added as such or as the equivalent proportion of a variety of copper compounds. For example, the copper may be added as metallic copper, or as inorganic compounds, such as copper sulfide, cuprous oxide or copper sulfate, or as soaps such as copper oleate or copper salts of the accelerators used, for example, as the cupric salt of the thiazole accelerator or as the cupric salt of the dithiocarbamic acid or the thiuram sulfide. Best results are secured with a proportion of sulfur upwards of about 50% by weight on the copper and within the maximum limits indicated by conventional practice. The copper appears to be particularly effective in the presence of an accelerator of the class consisting of the dithiocarbamates and thiuram sulfides, indicated by comparison of the values under "S" in Example II and in Example III. The copper is effective with those primary accelerators generally useful with such stocks although I have secured best results with thiazole accelerators, for example, mercaptobenzothiazole and benzo thiazyl disulfide. The dithiocarbamates and the thiuram sulfides are useful in proportions upwards of about 0.05% by weight on the copolymer and the thiazole accelerators are useful in proportions upwards of about 1% by weight on the copolymer, the maximum limits being those indicated by conventional practice.

In carrying out my invention the copper, or its equivalent compound, may be incorporated in the copolymer of butadiene and acrylonitrile before other compounding materials are added to produce a modified copolymer product exhibiting improved results when compounded with sulfur and subjected to vulcanization. My invention includes the modified copolymer, compounded and vulcanizable but unvulcanized copolymer, and the product of vulcanization of such copolymers containing copper and sulfur.

I claim:
1. A rubbery copolymer of butadiene and acrylonitrile containing as a sulphur vulcanization accelerator about 0.005–1% (calculated as copper) by weight on the copolymer of a material selected from the class consisting of metallic copper and compounds of copper effective to accelerate the sulphur vulcanization of the copolymer.

2. A rubbery copolymer of butadiene and acrylonitrile containing as a sulphur vulcanization accelerator about 0.1% (calculated as copper) by weight on the copolymer of a material selected from the class consisting of metallic copper and compounds of copper effective to accelerate the sulphur vulcanization of the copolymer.

3. A rubbery copolymer of butadiene and acrylonitrile containing about 0.005–1% (calculated as copper) by weight on the copolymer of a material selected from the class consisting of metallic copper and compounds of copper effective to accelerate the sulfur vulcanization of the copolymer and in excess of about 50% by weight on the copper of sulfur.

4. A rubbery copolymer of butadiene and acrylonitrile containing about 0.1% (calculated as copper) by weight on the copolymer of a material selected from the class consisting of metallic copper and compounds of copper effective to accelerate the sulfur vulcanization of the copolymer and in excess of about 50% by weight on the copper of sulfur.

5. The product of vulcanization of a rubbery copolymer of butadiene and acrylonitrile containing about 0.005–1% (calculated as copper) by weight on the copolymer of a material selected from the class consisting of metallic copper and compounds of copper effective to accelerate the sulfur vulcanization of the copolymer and in excess of about 50% by weight on the copper of sulfur.

6. The product of vulcanization of a rubbery copolymer of butadiene and acrylonitrile containing about 0.1% (calculated as copper) by weight on the copolymer of a material selected from the class consisting of metallic copper and compounds of copper effective to accelerate the sulfur vulcanization of the copolymer and in excess of about 50% by weight on the copper of sulfur.

7. A rubbery copolymer of butadiene and acrylonitrile containing about 0.005–1% (calculated as copper) by weight on the copolymer of a copper salt effective to accelerate the sulfur vulcanization of the copolymer and in excess of about 50% by weight on the copper of sulfur.

8. The product of vulcanization of a rubbery copolymer of butadiene and acrylonitrile containing a material of the class consisting of metallic copper and compounds of copper effective to accelerate the sulfur vulcanization of the copolymer, in excess of about 0.05% by weight on the copolymer of another accelerator and in excess of about 50% by weight on the copper of sulfur, the total copper content of the copolymer (calculated as copper) being not less than about 0.005% nor more than about 1% by weight on the copolymer.

9. The product of vulcanization of a rubbery copolymer of butadiene and acrylonitrile containing a material of the class consisting of metallic copper and compounds of copper effective to accelerate the sulfur vulcanization of the copolymer, in excess of about 0.05% by weight on the copolymer of a dithiocarbamate accelerator and in excess of about 50% by weight on the copper of sulfur, the total copper content of the copolymer (calculated as copper) being not less than about 0.005% nor more than about 1% by weight on the copolymer.

10. The product of vulcanization of a rubbery copolymer of butadiene and acrylonitrile containing a material of the class consisting of metallic copper and compounds of copper effective to accelerate the sulfur vulcanization of the copolymer, in excess of about 1% by weight on the copolymer of a thiazole accelerator and in excess of about 50% by weight on the copper of sulfur, the total copper content of the copolymer (calculated as copper) being not less than about 0.005% nor more than about 1% by weight on the copolymer.

11. The product of vulcanization of a rubbery copolymer of butadiene and acrylonitrile containing a material of the class consisting of metallic copper and compounds of copper effective to accelerate the sulfur vulcanization of the copolymer, in excess of about 0.05% by weight on the copolymer of another accelerator and in excess of about 50% by weight on the copper of sulfur, the total copper content of the copolymer (calculated as copper) being about 0.1% by weight on the copolymer.

12. A rubbery copolymer of butadiene and acrylonitrile containing about 0.005–1% (calculated as copper) by weight on the copolymer of a copper salt effective to accelerate the sulfur vulcanization of the copolymer.

ALBERT A. SOMERVILLE.